L. U. HURLBURT.
VEHICLE WHEEL.
APPLICATION FILED JAN. 27, 1920.

1,382,087.

Patented June 21, 1921.

INVENTOR
L. U. Hurlburt
Howard P. Denison
ATTORNEY

UNITED STATES PATENT OFFICE.

LAWSON U. HURLBURT, OF SYRACUSE, NEW YORK.

VEHICLE-WHEEL.

1,382,087. Specification of Letters Patent. Patented June 21, 1921.

Application filed January 27, 1920. Serial No. 354,349.

*To all whom it may concern:*

Be it known that I, LAWSON U. HURLBURT, of Syracuse, in the county of Onondaga, in the State of New York, have invented new and useful Improvements in Vehicle-Wheels, of which the following, taken in connection with the accompanying drawings, is a full, clear, and exact description.

This invention relates to certain improvements in vehicle wheels, the object being to provide simple and efficient means for clamping and releasing the rim with the spokes thereon upon the main body of the hub so that those parts with a tire on the rim may be readily demounted and replaced by similar parts to afford a quick shift of tires in case one should be deflated or otherwise rendered unfit for use.

Another object is to reinforce the inner ends of the spokes at their junction with the hub by means of a metal ring which may be locked in and released from its clamping position by means of a pawl on the nut forming a part of the means by which the spokes are clamped to the hub of the wheel.

A further object is to provide simple means for locking the nut and clamping plate against relative loosening.

Other objects and uses relating to specific parts of the wheel will be brought out in the following description.

As illustrated, the wheel comprises a central hub —1— having an inner enlarged end or annular flange —2— and an outer externally threaded end —3—, said hub being provided with a tapered bore —4— for receiving the adjacent end of an axle, not shown, while the outer threaded end is adapted to receive a cap nut —5—.

A series of spokes —6— are arranged circumferentially around the hub —1— with their adjacent inner end faces in contact and their inner end faces engaged with the periphery of said hub, the inner side faces of the spokes also resting against the outer end face of the flange —2—.

Figure 1:
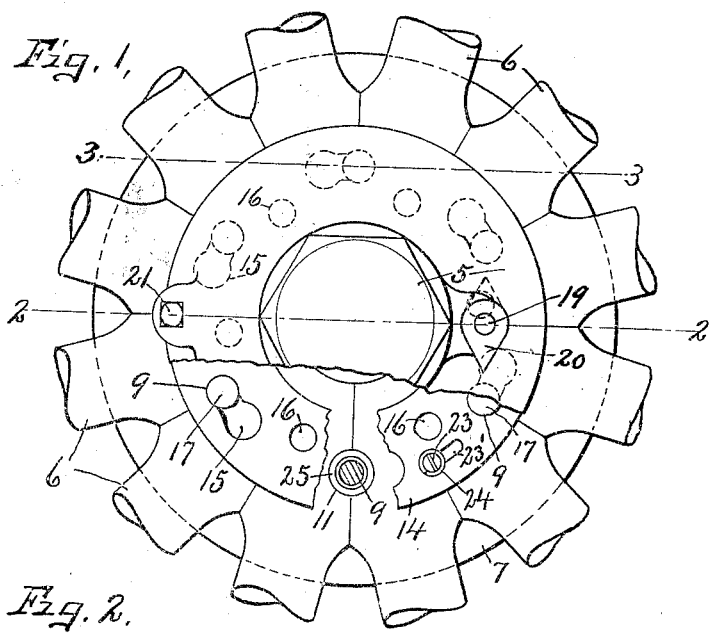
Figure 1 is an end view, partly broken away, of the central portion of a vehicle wheel embodying the features of my invention.
Figure 2:
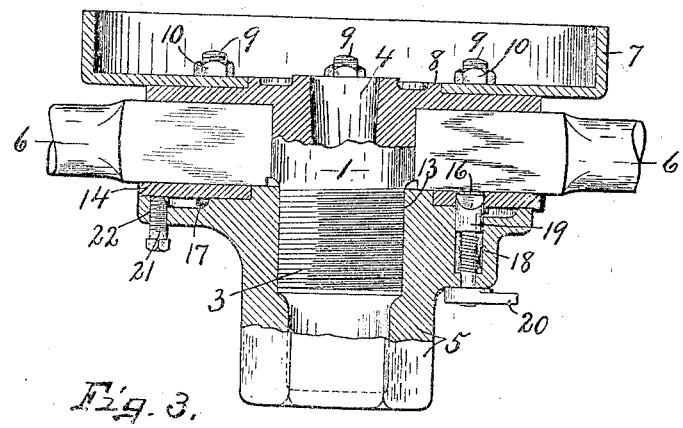
Fig. 2 is a sectional view taken on line 2—2, Fig. 1.
Figure 3:
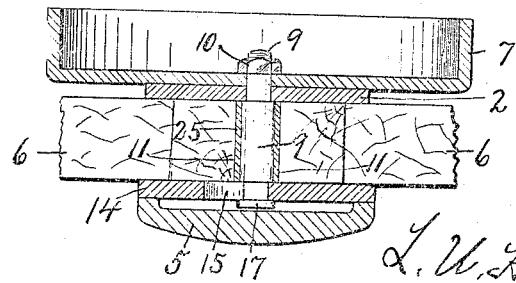
Fig. 3 is a detail sectional view taken on line 3—3, Fig. 1.

When the vehicle is mounted upon a driving axle or shaft, it is provided with a cup-shaped brake drum —7— fitted upon an axially extending flange —8— on the inner end of the hub and bolted thereto by a series of bolts —9— and nuts —10— as shown in Fig. 3.

These bolts are arranged in uniformly spaced relation circumferentially and extend outwardly through suitable recesses or openings —11— in the adjacent faces of the spokes, their inner ends, which pass through registering openings in the flange —2— and base of the brake drum —7—, being reduced in diameter to form shoulders —12— which abut against the outer end face of the flange —2—, the inner reduced ends being threaded for receiving the nuts —10— which engage the outer face of the base of the brake drum so that when the nuts are tightened, the brake drum will be securely fastened to the hub of the wheel.

The cap nut —5— is screwed upon the outer threaded end —3— of the hub —1— and has its inner end provided with a reduced annular flange —13— adapted to engage the outer faces of the adjacent portions of the spokes.

The clamping ring —14— is rotatably mounted upon the flange —13— and engages the outer faces of the adjacent portions of the spokes to reinforce the latter at their junction with the hub and also to hold the spokes against outward displacement when the ring —14— is clamped in place by the nut —5—. This ring —14— is provided with a series of circumferentially extending key hole slots —15— arranged in uniformly spaced relation circumferentially and corresponding in number to the number of bolts —9— which they are adapted to receive, said ring being also provided with a similar number of holes —16— for receiving the inner end of an axially moving pawl —17— which is slidably mounted in an opening —18— in one side of the cap nut whereby the ring —14— may be turned to lock and release it upon and from the outer ends of the bolts —9—. For this purpose the outer ends of the bolts protrude a short distance beyond the outer faces of the spokes where they are provided with annular grooves —17— for receiving the adjacent portions of the ring —14—.

That is, the ring —14— is disposed in the same transverse plane as that of the grooves —17— when the ring rests against the outer faces of the spokes while the slots —15— are disposed at the same distance from the axis of the wheel as the bolts, the enlarged ends of the slots being of slightly greater diameter than that of the outer ends of the bolts so that when registered therewith, the ring may be removed.

On the other hand the narrow portions of the slots —15— are of less width than the diameter of the bolts or of approximately the same width as that of the reduced portion of said bolts at the grooves—17— so that when the ring is placed in operative position against the outer faces of the spokes and turned in one direction or toward the large ends thereof, the walls of the reduced portions of the slots will ride into the grooves —17— and thereby lock the ring against outward displacement and at the same time hold the spokes firmly against the opposite flange —2—.

The holes —16— in the clamping ring —14— are adapted to receive the inner end of the pawl —19— which is mounted in the cap nut —5— and has its inner end beveled to permit it to ride out of the openings —16— when the cap nut is moved in one direction without effecting the operation of the ring —14— and to engage the wall of the opening with which it may be registered to rotate the ring when moved in the opposite direction.

The pawl —19— is rotatable in the socket —18— by means of an external handpiece —20— connected to the stem of said pawl whereby the beveled side may be adjusted to face in opposite directions according to the direction in which it is desired to rotate the ring —14—.

In this instance the reduced ends of the slots —15— extend from their larger ends in the direction of rotation of the cap nut —5— while the latter is being tightened or screwed upon the end of the hub during which operation the pawl —19— will have been detached to allow it to slip along the ring past the openings —16— as the cap nut approaches its final tightening by means of a suitable wrench at which time the direction of rotation of the cap nut may be reversed slightly to cause the pawl to engage in one of the openings —16— for rotating the ring —14— and thereby causing the reduced ends of the slots —15— to register with the grooves —17— in the outer ends of the bolts for locking the ring against the outer faces of the spokes, said ring being frictionally held against accidental rotation by screws —23— and lock washers —24—.

When the clamping ring —14— is locked in the manner just described, the tightening operation of the cap nut may be continued with the wrench still thereon until the spokes are firmly clamped against the inner hub flange —2— whereupon the cap nut and clamping ring may be locked against relative rotation by means of a set screw —21— which is engaged in a threaded aperture —22— in the flange of said nut for engagement with the outer face of the clamping ring, the clamping ring being prevented from rotation in the direction of unscrewing of the cap nut by the engagement of the end walls of the reduced portions of its slots —15— with the outer ends of the bolts —9—.

Suitable sleeves —25— of metal are preferably inserted in the bolt holes of the spokes for receiving the bolts —9— and protecting the adjacent portions of the spokes against undue wear or mutilation as the wheel is removed and replaced from and upon the hub.

In order to remove the wheel from the hub, the set screw —21— will first be loosened to permit the cap nut —5— to be unscrewed and after said cap nut has been slightly loosened, say a half turn, in the direction of unscrewing, the pawl —19— may be adjusted to cause it to engage in one of the holes —16— for shifting the clamping ring —14— rotarily as the cap nut is turned toward its retightened position until the enlarged ends of the slots —15— are registered with the heads of the bolts —9— whereupon the direction of rotation of the cap nut may be again reversed in the direction of unscrewing until entirely removed from the outer threaded end of the hub without removing the wrench, under which conditions the pawl will simply slide along the ring past the openings —16—, the ring being frictionally held in its adjusted position by the screws —23— and lock washers —24—.

When the cap nut is removed, the wheel may be withdrawn from the hub and replaced by a similar wheel, if desired, or by the same wheel after the necessary repairs have been made whereupon the cap nut may be placed in operative position and tightened and, together with the ring, locked in place in the manner previously described, it being understood that the clamping ring —14— will be removed with the wheel by reason of its attachment to the spokes by the screws —23—.

What I claim is:—

1. In a vehicle wheel, the combination of a hub having its inner end provided with an annular flange and its outer end screw threaded, spokes abutting against the periphery of the hub and outer face of the flange, bolts secured to said flange and projecting beyond the outer faces of the spokes and having their outer ends provided with annular grooves, a clamping ring against the outer faces of the spokes and provided with key hole slots for receiving the outer grooved ends of the bolts, said ring being rotatable to interlock the ring with said grooved ends, a nut screwing upon the outer threaded end of the hub and against the outer face of said ring to tighten the latter against the outer faces of the spokes, and means on the nut for adjusting said ring rotarily to and from its locking position as the nut is rotated.

2. In a vehicle wheel, the combination of a hub having its inner end provided with an annular flange and its outer end screw threaded, spokes abutting against the periphery of the hub and outer face of the flange, bolts secured to said flange and projecting beyond the outer faces of the spokes and having their outer ends provided with annular grooves, a clamping ring against the outer faces of the spokes and provided with key hole slots for receiving the outer grooved ends of the bolts, said ring being rotatable to interlock the ring with said grooved ends, a nut screwing upon the outer threaded end of the hub and against the outer face of said ring to tighten the latter against the outer faces of the spokes, means on the nut for adjusting said ring rotarily to and from its locking position as the nut is rotated, and a set screw for clamping the nut to the ring.

3. In a vehicle wheel, the combination of a hub having its inner end provided with an annular flange, spokes abutting against the outer face of said flange, bolts secured to the flange and extending outwardly beyond the outer faces of the spokes and having their outer ends provided with heads, a clamping ring applied to the outer faces of the spokes and rotatable into and out of engagement with the heads of the bolts, and a cap nut screwed upon the outer end of the hub and against the outer face of the clamping ring and provided with means for adjusting the ring rotarily.

4. In a vehicle wheel, the combination of a hub having its inner end provided with an annular flange, spokes abutting against the outer face of said flange, bolts secured to the flange and extending outwardly beyond the outer faces of the spokes and having their outer ends provided with heads, a clamping ring applied to the outer faces of the spokes and rotatable into and out of engagement with the heads of the bolts, a cap nut screwed upon the outer end of the hub and against the outer face of the clamping ring and provided with means for adjusting the ring rotarily, and means for locking the cap nut to the clamping ring.

In witness whereof I have hereunto set my hand this 21st day of January, 1920.

LAWSON U. HURLBURT.

Witnesses:
H. E. CHASE,
N. ROOT.